Dec. 23, 1969    J. McMAHON    3,485,335
TAPE EMBOSSING MACHINE WITH SELECTIVELY VARIABLE
TAPE FEED INCREMENTS
Filed Jan. 24, 1968    3 Sheets-Sheet 1

INVENTOR
JOHN McMAHON
BY
Sennelson & Jacob
HIS ATTORNEYS

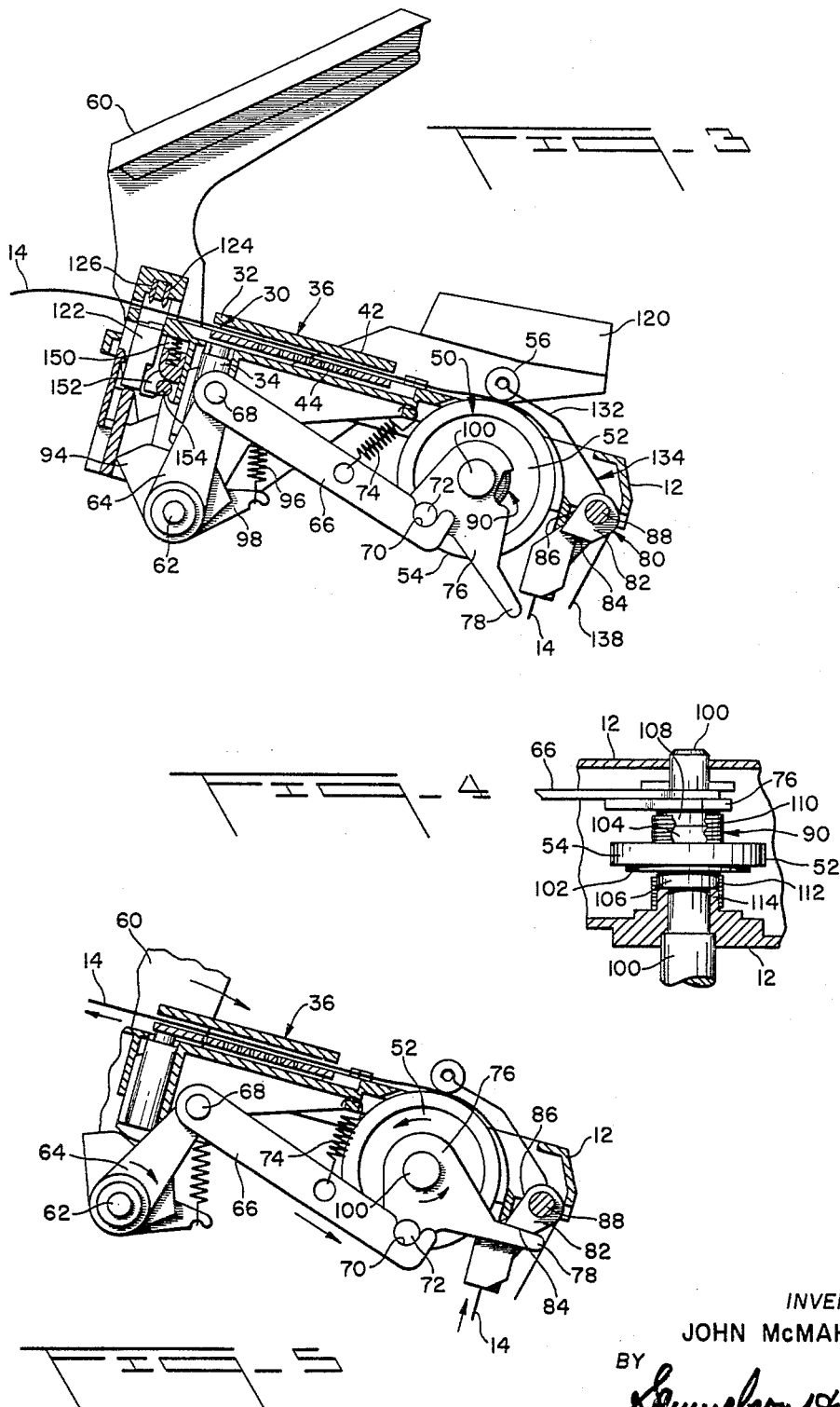

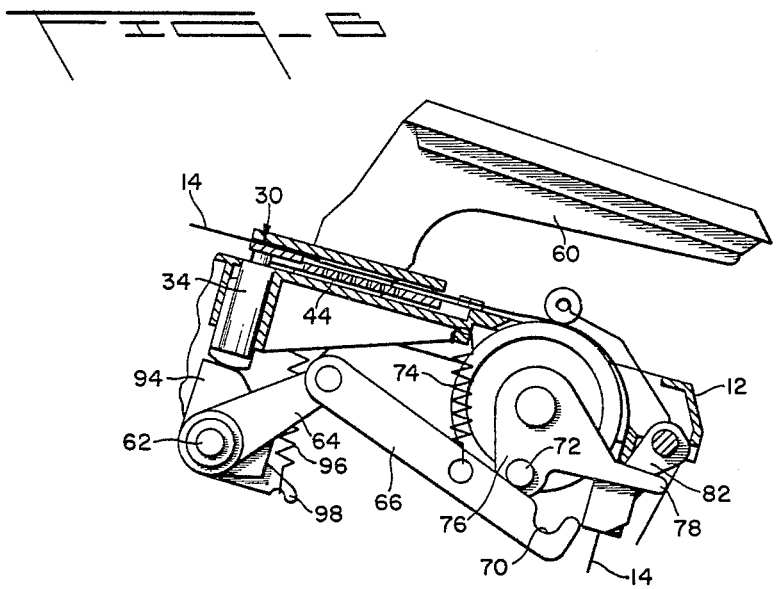
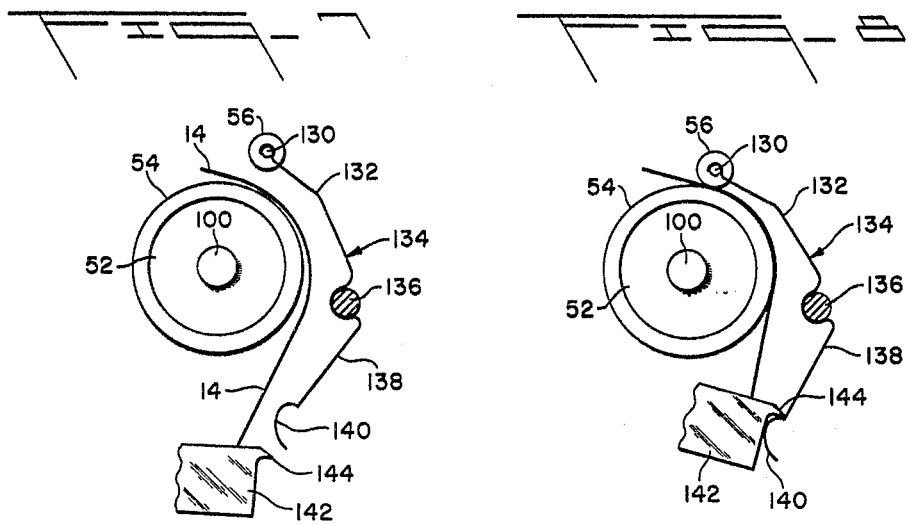

United States Patent Office 3,485,335
Patented Dec. 23, 1969

3,485,335
TAPE EMBOSSING MACHINE WITH SELECTIVELY VARIABLE TAPE FEED INCREMENTS
John McMahon, Livermore, Calif., assignor to Dymo Industries, Inc., Emeryville, Calif., a corporation of California
Filed Jan. 24, 1968, Ser. No. 700,114
Int. Cl. B41j 1/30, 3/38; B44b 5/00
U.S. Cl. 197—6.7                                           6 Claims

ABSTRACT OF THE DISCLOSURE

An embossing machine in which an elongate strip of embossable material is advanced in increments of selectively variable length by a feed roll operated by a depressable actuating lever connected by means of a link to a crank which is engaged with the feed roll by a clutch during depression of the lever to rotate the feed roll until the crank contacts a stop, the position of the stop being selectively variable to vary the travel of the crank and hence the angular displacement of the feed roll, the continued depression of the lever after the stop is contacted by the crank serving to actuate embossing means for embossing a character in the strip material.

---

The present invention relates generally to embossing machines and pertains, more specifically, to embossing machines in which an elongate strip of embossable material is advanced in increments through the machine and the length of the increments of advancement may be selectively varied.

A variety of embossing machines is presently available for establishing embossments in strips of embossable material in the fabrication of labels, signs, plates, tags, and like embossed articles. More recently, such tools have been developed for embossing various indicia on thin plastic strips formed of sheeted thermoplastic synthetic resins which are capable of being cold-formed to establish a contrast color relief enfigurement therein.

Usually the machines employ embossing means for establishing the desired embossments, a supply of strip material and means for feeding the strip material from the supply to the embossing means. The strip material is generally in the form of an elongate flexible tape supplied in a coil which is conveniently placed in a magazine, the magazine being received within the body of the machine. Often the tape is supplied in different widths so that embossed articles of different widths may be fabricated.

In embossing indicia on the tape, it is desirable to register the tape accurately with respect to the embossing means, both in a lateral direction and in a longitudinal direction, so that the indicia will be embossed along a uniform, well-spaced line on the tape. Since such machines often have interchangeable embossing means so that indicia of various sizes may be embossed as well as various styles, it has been found desirable to provide facilities for varying the spacing between consecutive embossed characters in order to obtain the desired spacing between consecutive embossed characters of any chosen set of embossing means.

It is therefore an important object of the invention to provide an embossing machine of the type set forth above and in which the increment of advancement of the embossable tape may be selectively varied with increased ease and with a mechanically simplified mechanism.

Another object of the invention is to provide such an embossing machine with a tape feed arrangement including a drive mechanism which is capable of smooth, silent and accurate advancement of well-defined increments of the tape in combination with ease of change in the length of each increment.

Still another object of the invention is to provide an embossing machine having a smooth and silent tape advancing mechanism which advances an accurately determined increment of tape during each cycle of operation and does so prior to the actuation of the embossing means during that same cycle of operation.

A further object of the invention is to provide an embossing machine including the above advantages and further having a magazine tape supply which is easily inserted into the machine and held securely therein. A still further object of the invention is to provide an embossing machine of the type described above wherein the tape is supplied in a magazine and is easily interchanged by interchanging tape supply magazines, both the threading of the tape through the tape feed mechanism and the retraction of the tape from the tape feed mechanism being facilitated by the construction of the tape feed arrangement and the magazine securement mechanism.

The above objects, as well as further objects and advantages, are attained by the invention which may be described briefly as an embossing machine in which an elongate strip of embossable material is advanced along a path of travel from a strip supply to an embossing station in increments of selectively varied length, the machine including a frame, an actuating lever mounted on the frame for reciprocating movement between a rest position and a fully depressed position, feed means for gripping and advancing the strip in response to actuation of the actuating lever, the feed means including a feed roll mounted for rotation on the frame about an axis and having a feed surface intercepting the path of travel, drive means mounted on the frame for movement coaxial with the feed roll, a link interconnecting the actuating lever with the drive means for moving the drive means between first and second positions in response to movement of the actuating lever toward and away from the depressed position, a clutch engaging the drive means with the feed roll for rotation of the feed roll with movement of the drive means from the first position to the second position during movement of the actuating lever from the rest position toward the depressed position and disengaging the drive means from the feed roll during movement of the drive means from the second position to the first position and movement of the actuating lever from the depressed position to the rest position, means for selectively limiting the movement of the drive means to selectively change the distance between the first and second positions of the drive means and thus change the length of the increment of the strip advanced by the feed roll, lost motion means between the link and the drive means for permitting continued movement of the actuating lever to the fully depressed position after the drive means reaches the second position thereof, and embossing means at the embossing station for embossing the strip in response to the continued movement of the actuating lever. In addition, the feed means may include an idler roll, means mounting the idler roll for rotation about an axis parallel to the axis of rotation of the feed roll and for transverse movement toward and away from the feed surface of the feed roll, and means for urging the idler roll toward the feed surface of the feed roll in response to the presence of a supply of strip material in the machine, and allowing transverse movement of the idler roll away from the feed surface in response to the absence of a strip supply in the machine.

The invention will be more fully understood and still further objects and advantages thereof will become apparent in the following detailed description of a preferred embodiment of the invention illustrated in the accompanying drawing, in which:

FIGURE 3 is a partially diagrammatic, cross-sectional view taken along line 3—3 of FIGURE 1;

FIGURE 4 is a bottom plan view of a portion of the embossing machine shown in FIGURE 3;

FIGURE 5 is a cross-sectional view similar to FIGURE 3, but with the component parts in another operating position;

FIGURE 6 is a cross-sectional view similar to FIGURE 5, but with the component parts and still another operating position;

FIGURE 7 is an enlarged diagrammatic view of a portion of the embossing machine showing the insertion of a magazine supply; and FIGURE 8 is a view similar to FIGURE 7 with the magazine inserted and secured.

Figure 1:
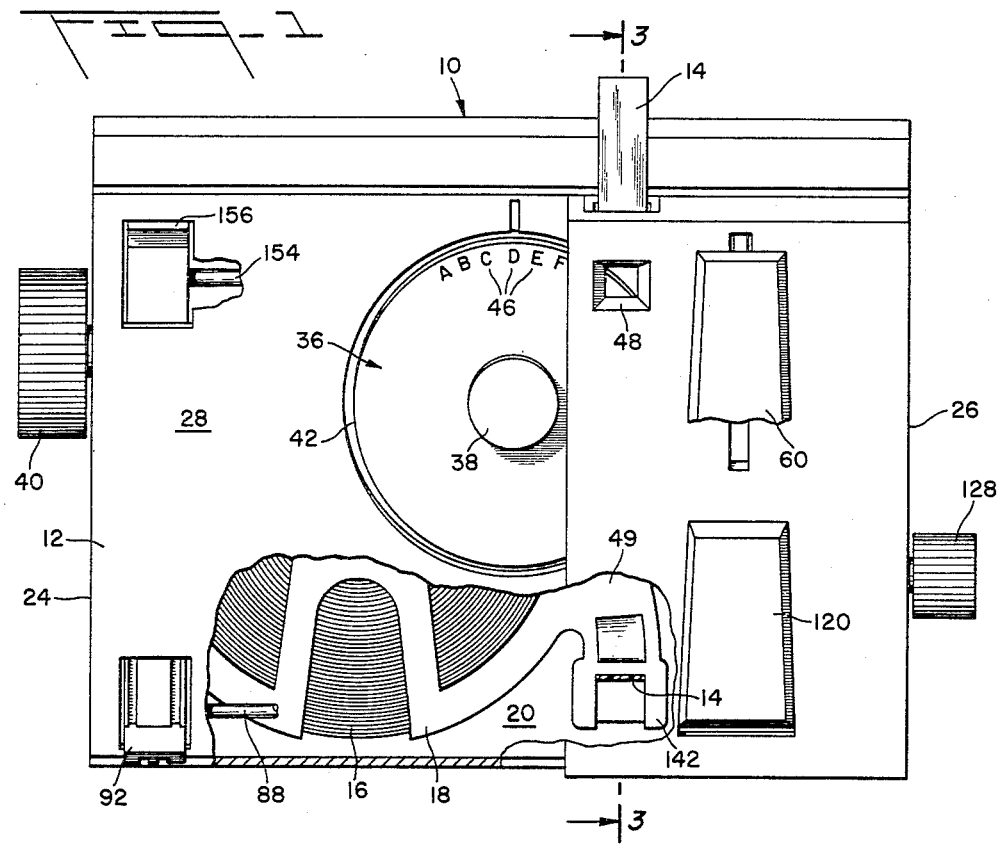
FIGURE 1 is a plan view of an embossing machine constructed in accordance with the invention.
Figure 2:
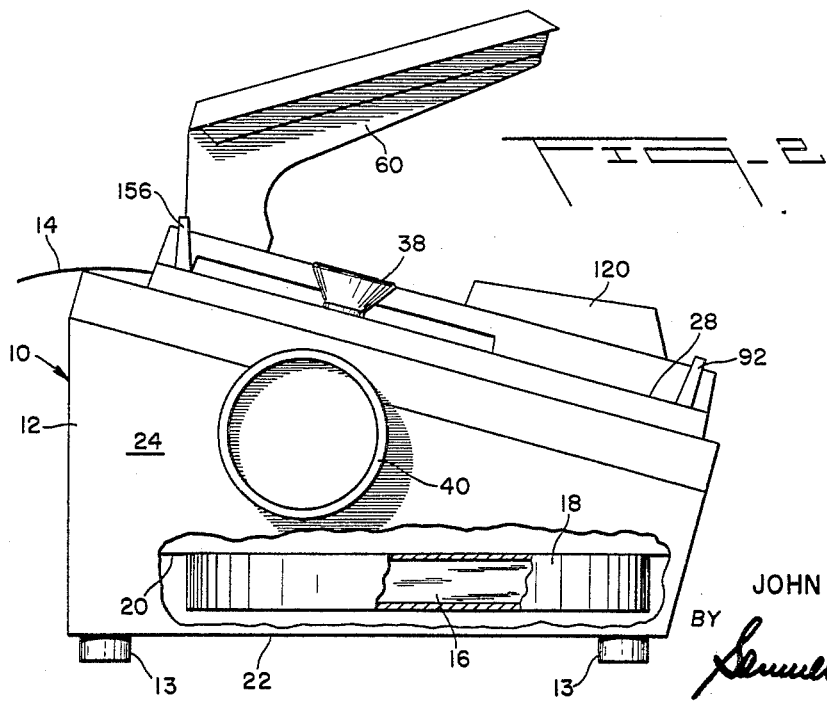
FIGURE 2 is an end elevational view of the embossing machine of FIGURE 1.

Referring now to the drawing, an embossing machine constructed in accordance with the invention is illustrated generally at 10 in FIGURES 1 and 2 and is seen to be a hand-operated, desk-top model. Machine 10 has a body or frame 12 with a general configuration which acts as a support for the machine and from which depend feet 13 which will support the frame on a desk top or table top. The machine is designed to emboss selected indicia in an elongate strip of embossable material such as the variety of thermoplastic resins currently available in the form of plastic tape. As seen in FIGURES 1 and 2, an embossable tape 14 is supplied in the form of a coil or roll 16, the roll being placed within a tape magazine 18 received within a socket 20 located adjacent the bottom 22 of the frame of the machine. Machine 10 has opposite sides 24 and 26, and a top 28 as well as bottom 22.

Turning now to FIGURES 3 and 4, as well as FIGURES 1 and 2, embossing of the tape 14 is accomplished at an embossing station 30 wherein there is located embossing means shown in the form of embossing die set 32 activated by an actuating member 34 mounted for reciprocation in the frame 12 and supported in place beneath the die set. Die set 32 is one of a series of die sets located in the periphery of selector wheel 36 which is mounted upon frame 12 for rotation about a spindle 38 by rotation of a knob 40 so that any one of the series of die sets can be located at the embossing station 30 to emboss selected indicia in the tape 14. Selector wheel 36 is made up of upper and lower discs 42 and 44, respectively, one of which carries the die and the other of which carries the punch of each die set. As best seen in FIGURE 1, the upper disc 42 is provided with visible characters 46 on the outer face thereof corresponding to the indicia which can be embossed by the selectable die sets. The visible characters are located along the perpihery of the selector wheel 36 in such a way that when a particular die set is located at the embossing station 30, the corresponding visible character may be viewed at a selector slot 48 provided in the frame 12.

Tape 14 is fed from supply roll 16 through a duct 49 in magazine 18 and is advanced along a path of travel toward the embossing station 30 by feed means 50 which includes a feed roll 52 having a feed surface 54 which frictionally grips the tape where an idler roll 56 presses the tape against the feed surface and advances the tape in prescribed increments by being rotated in a counterclockwise direction in a manner which will be explained hereinafter.

Embossing of tape 14 is accomplished by depressing actuating lever 60, which is pivotally mounted upon the frame 12 at 62, to move the actuating lever from a rest position, shown in FIGURE 3, toward a fully depressed position, shown in FIGURE 6. Such depression of the actuating lever will rotate an integral lever arm 64 in a clockwise direction, thereby displacing a link 66, which is pinned to the lever arm 64 at 68, to the right as seen in FIGURE 5. At the other end of the link 66 is a notch 70 which is normally urged into engagement with a crank pin 72 by means of a biasing spring 74. The crank pin 72 projects axially from a crank member 76 which is journaled for pivotal movement coxial with the feed roll 52 and includes a radially projecting crank arm 78 which now travels in a counterclockwise direction along an arcuate path of travel. A stop means 80 lies in the arcuate path of travel of the crank arm 78 and is shown in the form of a block 82 having a first abutment surface 84 and a second abutment surface 86, the block 82 being affixed to a shaft 88 which is mounted for rotation in the frame so that the block may be indexed to place either one of the first and second abutment surfaces directly in the path of the crank arm. Thus, the crank member 76 will rotate in a counterclockwise direction until the actuating lever 60 arrives at a depressed position where the crank arm 78 contacts an abutment surface, which in this instance is the first abutment surface 84 shown lying directly in the path of the crank arm.

As best seen in FIGURES 3 and 4, the crank member 76 is interconnected with the feed roll 52 by means of a clutch 90 which engages the crank member with the feed roll such that upon counterclockwise movement of the crank member, the feed roll will be likewise rotated in a counterclockwise direction to advance the tape 14 along the path of travel toward the embossing station 30. Thus, the increment of advancement of the tape is governed by the angular displacement of the crank member which, in turn, is measured by the location of the particular abutment shoulder of the stop means 80 in the path of travel of the crank arm 78 of the crank member 76. Hence, the increment of advancement may be changed readily by merely rotating the shaft 88 upon which the block 82 is mounted to present either one of the first and second abutment surfaces to the crank arm. As best seen in FIGURES 1 and 2, the shaft 88 carries a selector lever 92 which may be thrown to either one of two positions so as to index the block and change the arcuate distance between the rest position of the crank arm and an abutment surface and thus change the increment of advancement of the tape 14.

Upon continued depression of the actuating lever 60, the crank member 76 can no longer move; however, the force exerted by the lever arm 64 upon the link 66 will overcome the biasing force of the spring 74 so that the notch 70 will be urged out of engagement with the crank pin 72 and the link will continue its displacement toward the right, as seen in FIGURE 6, without requiring further displacement of the crank member, the notch and pin arrangement thus serving as a lost-motion mechanism. Such continued depression of the actuating lever will rotate an integral cam member 94 to urge the actuating member 34 vertically upwardly into contact with a portion of the lower disc 44 and will continue such movement of the actuating member 34 until the actuating member actuates the die set positioned at the embossing station 30 and an embossment is established in the tape 14.

When the actuating lever reaches its fully depressed position, as seen in FIGURE 6, the embossment is complete and the actuating lever 60 is released. Upon release of the actuating lever, a return spring 96 which extends between the frame 12 and a second lever arm 98 integral with the actuating lever 60, will return the actuating lever to its rest position, rotating the first lever arm 64 in a counterclockwise direction and drawing the link 66 toward the left to again engage the notch 70 with the crank pin 72 and pivot the crank member 76 back to its first position. Such pivotal movement of the crank member is permitted to take place without movement of the feed roll in a clockwise direction by virtue of the clutch 90 which releases the crank member for clockwise rotation relative to the feed roll, as will now be explained.

As best seen in FIGURE 4, a shaft 100 is journaled for rotation within the frame 12 of the machine, and the feed roll 52 is affixed to the shaft 100 for rotation therewith. The fed roll 52 may be rotated in a counterclockwise direction by counterclockwise displacement of drive means shown in the form of the crank member 76, but is maintained stationary during clockwise displacement of the crank member by virtue of the clutch 90. Thus, the feed roll 52 includes an arbor 102 having portions 104 and 106 extending axially from each end of the arbor of the feed roll. The crank member 76 is provided with an integral drum 108 having an external diameter equal to the external diameter of the arbor portion 104 and mounted coaxially therewith upon shaft 100 for rotation relative to the shaft and the feed roll. A first helical clutch spring 110 couples the drum 108 and the juxtaposed arbor portion 104 and has an internal diameter small enough so that the convolutions of the spring 110 will grip the drum and the arbor portion during counterclockwise displacement of the crank member 76 and activate the clutch 90 to rotate the feed roll 52 in a counterclockwise direction and advance the tape 14 accordingly. However, the convolutions of the clutch spring 110 are so oriented that upon rotation of the drum 108 in a clockwise direction, the grip of the clutch spring 110 may be relaxed so that the clutch 90 is deactivated and relative rotation between the drum 108 and the arbor portion 104 may take place. By orienting the convolutions of the helical clutch spring 110 such that the path of the helix followed by the convolutions advances from the crank member toward the feed roll as the helix is followed in a clockwise direction in FIGURE 3, it will be seen that counterclockwise rotation of drum 108 will only tend to radially contract the helical clutch spring 110 and thus tighten the grip exerted by clutch spring 110 upon the drum 108 and the arbor portion 104 while clockwise rotation of the drum will tend to radially expand the clutch spring 110 and relax the grip. A second helical clutch spring 112 couples the arbor portion 106 with a juxtaposed cylindrical boss 114 projecting from the frame 12 of the machine 10. The convolutions of clutch spring 112 are oriented opposite to those of the first clutch spring 110 so that the path of the helix followed by the convolutions of the second clutch spring 112 advances form the boss 114 toward the feed roll as the helix is followed in a counterclockwise direction in FIGURE 3. Thus, second clutch spring 112 will tend to contract and grip arbor portion 106 and the juxtaposed boss 114 tightly upon any attempt to rotate the feed roller in a clockwise direction, but the spring 112 will tend to dilate radially and the grip will be relaxed to allow counterclockwise rotation of the feed roll. Since the boss 114 is integral with the frame 12 of the machine and is thus fixed against rotation, it will be seen that movement of the crank member 76 in a clockwise direction will cause second clutch spring 112 to grip arbor portion 106 and maintain the feed roll stationary while first clutch spring 110 will relax its grip and permit rotation of drum 108 relative to arbor portion 104 of the stationary feed roll. Upon movement of a crank member 76 in a counterclockwise direction, the first clutch spring 110 will grip the drum 108 and the corresponding arbor portion 104 to drive the feed roll in a counterclockwise direction while the second clutch spring 112 will relax its grip and permit such rotation. It will be apparent that the above described clutch mechanism allows the tape 14 to be advanced through an increment of any chosen length, the length of the increment being defined by the amount of counterclockwise displacement of the crank member 76. Hence, stop means 80 may be provided with an abutment shoulder at any desired location to attain a desired increment.

Upon completion of the last desired embossment, the tape 14 may be advanced and the completed embossed article may be severed from the tape by a cut-off means shown in the form of a cut-off handle 120 (see FIGURES 1 through 3) mounted for pivotal movement upon the frame 12 such that depression of the cut-off handle 120 will raise in anvil 122 (FIGURE 3) located below the path of the tape 14. Such upward movement of the anvil 122 will bring the tape 14 against cutting blades 124 and 126 mounted above the path of travel of the tape. Blade 124 will then sever the tape while blade 126 will establish a tab at the severed end of the completed embossed article for facilitating the subsequent removal of a backing strip which is generally present as a part of the embossable strip material. Upon completion of the cutting operation, the cut-off handle is released and the anvil and the cut-off handle will return to their normal rest positions as seen in FIGURE 3.

It is noted that advancement of the tape 14 without embossment of the tape may be accomplished either manually by rotation of the knob 128 which is affixed to the shaft 100 upon which the feed roll 52 is mounted or by depression of the actuating lever 60 up to the point where the crank arm 78 contacts the abutment surface 84 of the stop means 80. Since the continued depression of the actuating lever beyond the point where the crank arm contacts the abutment surface of the stop means requires an additional actuating force to overcome the bias of the spring 74 and effect the disengagement of the notch 70 from the crank pin 72, it now becomes feasible to obtain an accurate measured increment of advancement of the tape 14 without effecting an embossment by merely discontinuing depression of the actuating lever upon sensing the noticeable increase required in the actuating force and allowing the actuating lever to return to its rest position. Thus, the arrangement of the drive means allows a simplified procedure for obtaining accurate spacing wherever desired along the length of the tape.

Selector wheel 36 may be removed from the frame of the tool and replaced with any one of a number of selector wheels provided with a variety of embossable characters of different styles and sizes by merely removing spindle 38 from the frame and sliding selector wheel 36 laterally out of the machine.

Since machine 10 is constructed for use with tapes of various widths and with selector wheels having embossing means of various sizes, it is important that the tape supply magazine 18 be readily removed and replaced when desired. Such a facility requires that any tape which is threaded through the machine be easily retracted for removal of a magazine from the machine. Retraction of the tape is ordinarily impeded by the gripping of the tape between the feed surface 54 and the idler roll 56. In order to release that grip, the idler roll 56 is mounted for rotation upon a shaft 130, as seen in FIGURES 7 and 8, and the shaft is carried by a leg 132 of a carrier member 134 which is mounted for pivotal movement upon the frame by means of a pin 136. A second leg 138 of the carrier member extends into the socket 20 and has a detent 140 at the end thereof. When the magazine 18 is in place within the machine, the neck 142 of the magazine presses against the second leg 138 of the carrier member 134 thereby urging the carrier member in a counterclockwise direction and biasing the idler roll against the feed surface of the feed roll. Upon removal of the magazine from the machine, as seen in FIGURE 7, the carrier member is free to pivot in a clockwise direction, thereby releasing the bias of the idler roll toward the feed roll and allowing the idler roll to move transversely to release the grip upon the tape 14 lying between the idler roll and the feed roll. Both the first and the second legs of the carrier member are resiliently deflectable; hence, upon insertion of the magazine into the machine, as seen in FIGURE 8, the abutment 144 on the neck of the magazine will pass beyond the detent 140 and will be engaged by the detent to secure the magazine in place in the machine. At the same time the idler roll 56 will be resiliently biased toward the feed roll 52.

In order to accommodate different tape widths, a pair of tape side edge guides 150 may be selectively raised or lowered to provide a throat of correct width, corresponding to the width of the tape 14, between the embossing station 30 and the cut-off means (see FIGURE 3). The guides 150 are raised or lowered by rotation of a cam 152 which is affixed to a shaft 154 mounted for rotation in the frame 12 and operated by another operator lever 156 (FIGURES 1 and 2) projecting through the top panel of the machine.

It is to be understood that the above detailed description of a preferred embodiment of the invention is provided by example only. Various details of design and construction may be modified without departing from the true spirit and scope of the invention set forth in the appended claims.

The embodiments of the invention in which an exclusive property or privilege is claimed are defined as follows:

1. An embossing machine in which an elongate strip of embossable material is advanced along a path of travel from a strip supply to an embossing station in increments of selectively varied length, said machine including:
 a frame;
 an actuating lever mounted on the frame for reciprocating movement between a rest position, a depressed position and a fully depressed position;
 feed means for gripping advancing the strip in response to actuation of the actuating lever, said feed means including a feed roll mounted for rotation on said frame about an axis and having a feed surface intercepting said path of travel;
 drive means mounted on said frame for movement coaxial with the feed roll;
 a link interconnecting the actuating lever with the drive means for moving said drive means between first and second positions in response to movement of the actuating lever to and away from the depressed position;
 a clutch engaging the drive means with the feed roll for rotation of the feed roll with movement of the drive means from the first position to the second position during movement of the actuating lever from the rest position toward the depressed position and disengaging the drive means from the feed roll during movement of the drive means from the second position to the first position and movement of the lever from the depressed position to the rest position;
 means for selectively limiting the movement of the drive means to selectively change the distance between said first and second positions of the drive means and thus change the length of the increment of said strip advanced by the feed roll;
 lost motion means between the link and the drive means for permitting continued movement of the actuating lever from the depressed position to the fully depressed position after the drive means reaches the second position thereof; and
 embossing means at said embossing station for embossing said strip in response to said continued movement of the actuating lever.

2. The embossing machine of claim 1 wherein:
 said drive means includes a crank member mounted on said frame for pivotal movement coaxial with the feed roll and including a radially projecting arm;
 stop means are mounted on the frame in the path of movement of said arm;
 the link interconnects the actuating lever with the crank member for pivoting the crank member between first and second positions and moving the arm toward and away from the stop means in response to movement of the actuating lever toward and away from the depressed position, the angular displacement of the crank member being limited by contact of the arm with said stop means;
 the clutch engages the crank member with the feed roll for rotation of the feed roll with movement of the crank member from the first to the second position thereof during movement of the actuating lever from the rest position toward the depressed position and disengages the crank member from the feed roll during movement of the crank member from the second position toward the first position; and
 said means for selectively limiting the movement of the drive means includes means for selectively changing the location of the stop means long the path of movement of the arm to selectively change said angular displacement and the length of the increment of said strip advanced by the feed roll.

3. The embossing machine of claim 2 wherein said stop means includes a block mounted on said frame for pivotal movement with respect thereto and including at least two abutment surfaces, either one of which surfaces may be positioned in the path of movement of the arm by pivotal movement of the block, one of said abutment surfaces, when positioned in the path of movement of the arm, being located further from the first position of the arm than the other of said abutment surfaces, when positioned in the path of movement of the arm.

4. The embossing machine of claim 2 wherein said lost motion means includes a pin projecting axially from said crank member, a notch in said link, and means biasing the link against the pin and urging the notch into engagement with the pin during movement of the crank member with the link, said biasing means permitting disengagement of the notch from the pin upon contact of the arm with the stop means.

5. The embossing machine of claim 2 wherein said clutch comprises:
 a first helical spring coupling the crank member and the feed roll and including convolutions encircling and engaging at least a portion of the crank member and encircling and engaging at least a portion of the feed roll, said convolutions following a helical path of revolution in a first direction of revolution arranged for operatively engaging the crank member and the feed roll for concurrent movement thereof during movement of the crank member from said first position to said second position thereof and for permitting movement of the crank member relative to the feed roll during movement of the crank member from said second position toward said first position thereof; and
 a second helical spring coupling the feed roll and the frame and including convolutions encircling and engaging at least a portion of the feed roll and encircling and engaging at least a portion of the frame, said convolutions following a helical path of revolution in a second direction of revolution opposite to said first direction of revolution and arranged for permitting rotation of the feed roll in a direction to advance the strip and precluding movement of the feed roll in an opposite direction.

6. The embossing machine of claim 2 wherein:
said feed means includes an idler roll;
means mounting said idler roll for rotation about an axis parallel to the axis of rotation of the feed roll and for transverse movement toward and away from the feed surface of the feed roll; and
means for urging said idler roll toward the feed surface of the feed roll in response to the presence of a supply of strip material in said machine, and allowing transverse movement of the idler roll away from the feed surface in response to the absence of a strip supply in the machine.

(References on following page)

References Cited

UNITED STATES PATENTS

| | | | |
|---|---|---|---|
| 3,255,860 | 6/1966 | Bremer | 197—6.7 |
| 3,263,790 | 8/1966 | Bremer et al. | 197—6.7 |
| 3,366,212 | 1/1968 | McInnis | 197—6.7 |
| 3,389,772 | 6/1968 | Sjogren et al. | 197—6.7 |
| 3,391,773 | 7/1968 | Nicole et al. | 197—6.7 |

EDGAR S. BURR, Primary Examiner

U.S. Cl. X.R.

101—18

PO-1050
(5/69)

UNITED STATES PATENT OFFICE
CERTIFICATE OF CORRECTION

Patent No. 3,485,335　　　　　　　　Dated December 23, 1969

Inventor(s) JOHN McMAHON

It is certified that error appears in the above-identified patent and that said Letters Patent are hereby corrected as shown below:

Column 4, line 8, "coxial" should read -- coaxial --; Column 7, line 29, between "gripping" and "advancing" insert -- and --; Column 8, line 13, "long" should read -- along --.

Signed and sealed this 7th day of July 1970.

(SEAL)
Attest:

EDWARD M. FLETCHER, JR.　　　　　　　WILLIAM E. SCHUYLER, JR.
Attesting Officer　　　　　　　　　　Commissioner of Patents